US012776988B2

(12) United States Patent
Vaduvatha et al.

(10) Patent No.: US 12,776,988 B2
(45) Date of Patent: Oct. 27, 2026

(54) HARDWARE ARCHITECTURE OF CUSTOM CORE FOR CONGESTION CONTROL

(71) Applicant: Google LLC, Mountain View, CA (US)

(72) Inventors: Srinivas Vaduvatha, San Jose, CA (US); Hassan Mohamed Gamal Hassan Wassel, San Jose, CA (US); Ye Tang, Palo Alto, CA (US); Sarin Thomas, Sunnyvale, CA (US); Rakesh Gautam, Fremont, CA (US); Prashant Chandra, San Jose, CA (US); Anupam Jain, Bangalore (IN)

(73) Assignee: Google LLC, Mountain View, CA (US)

( * ) Notice: Subject to any disclaimer, the term of this patent is extended or adjusted under 35 U.S.C. 154(b) by 126 days.

(21) Appl. No.: 18/763,556

(22) Filed: Jul. 3, 2024

(65) Prior Publication Data

US 2025/0016100 A1 Jan. 9, 2025

Related U.S. Application Data

(60) Provisional application No. 63/525,462, filed on Jul. 7, 2023.

(51) Int. Cl.
*H04L 47/122* (2022.01)
*H04L 47/125* (2022.01)

(52) U.S. Cl.
CPC .......... *H04L 47/122* (2013.01); *H04L 47/125* (2013.01)

(58) Field of Classification Search
CPC ......... H04L 29/06; H04L 49/00; H04L 49/10; H04L 49/103; H04L 49/20; H04L 49/205; H04L 49/65; H04L 47/00; H04L 47/10; H04L 47/12; H04L 47/122; H04L 47/125; H04L 47/001; H04L 47/14; H04L 45/00; G06F 9/50; G06F 1/32
See application file for complete search history.

(56) References Cited

U.S. PATENT DOCUMENTS

| | | | | |
|---|---|---|---|---|
| 6,370,623 | B1 * | 4/2002 | Mehra | G06F 9/30141 711/149 |
| 8,799,547 | B2 * | 8/2014 | Mahadevan | G06F 9/4812 710/267 |
| 8,862,836 | B2 * | 10/2014 | Damodaran | G06F 5/00 711/E12.001 |
| 10,333,846 | B2 * | 6/2019 | Singhal | H04L 45/7453 |
| 11,979,330 | B2 * | 5/2024 | Wang | H04L 47/25 |
| 2008/0002575 | A1 * | 1/2008 | Kumar | H04L 47/36 370/229 |

(Continued)

FOREIGN PATENT DOCUMENTS

EP 3930272 A1 12/2021

OTHER PUBLICATIONS

Alizadeh et al., "Data Center TCP (DCTCP)," Microsoft Research, Standford University, SIGCOMM'10, 2010. (Year: 2010).*

(Continued)

*Primary Examiner* — Umar Cheema
(74) *Attorney, Agent, or Firm* — Lerner David LLP

(57) ABSTRACT

A custom processor core is provided, wherein the custom processor core may be used for congestion control in reliable transport protocols. The hardware architecture of the custom processor core allows for custom instructions, special register sets, and datapath enhancements for accelerating congestion control algorithms to achieve higher performance.

18 Claims, 12 Drawing Sheets

(56) References Cited

U.S. PATENT DOCUMENTS

| | | | | |
|---|---|---|---|---|
| 2012/0236726 | A1* | 9/2012 | Shihada | H04W 28/021 370/237 |
| 2016/0124883 | A1* | 5/2016 | Thompson | G06F 13/364 710/110 |
| 2018/0357165 | A1* | 12/2018 | Helmick | G06F 12/0246 |
| 2021/0152484 | A1* | 5/2021 | Shpigelman | H04L 47/326 |
| 2023/0139762 | A1* | 5/2023 | Ibanez | G06F 9/52 718/104 |
| 2023/0362098 | A1* | 11/2023 | Wang | H04L 47/12 |

OTHER PUBLICATIONS

Cardell, Neal, et al., BBR Congestion-Based Congestion Control, ACM.org, Dec. 2016, 34 pages.

Dukkipati, Nandita, Congestion Control in the Real World, Web page handout, Oct. 12, 2020, 36 pages.

Data Center Transmission Control Protocol, Learn.microsoft.com, Aug. 2016, 2 pages.

Bensley, Stephen, et al., Data Center TCP (DCTCP): TCP Congestional Control for Data Centers, Datatrack IETF Organization, Sep. 2021, 17 pages.

Extended European Search Report for European Patent Application No. 24186868.6 dated Nov. 4, 2024. 18 pages.

* cited by examiner

```
function [31:0] Log2Floor;
  input [31:0] reg_a;

  begin
      logic [4:0] t;

      assign t = reg_a[31] ? 5'd31 :
                 reg_a[30] ? 5'd30 :
                 reg_a[29] ? 5'd29 :
                 reg_a[28] ? 5'd28 :
                 reg_a[27] ? 5'd27 :
                 reg_a[26] ? 5'd26 :
                 reg_a[25] ? 5'd25 :
                 reg_a[24] ? 5'd24 :
                 reg_a[23] ? 5'd23 :
                 reg_a[22] ? 5'd22 :
                 reg_a[21] ? 5'd21 :
                 reg_a[20] ? 5'd20 :
                 reg_a[19] ? 5'd19 :
                 reg_a[18] ? 5'd18 :
                 reg_a[17] ? 5'd17 :
                 reg_a[16] ? 5'd16 :
                 reg_a[15] ? 5'd15 :
                 reg_a[14] ? 5'd14 :
                 reg_a[13] ? 5'd13 :
                 reg_a[12] ? 5'd12 :
                 reg_a[11] ? 5'd11 :
                 reg_a[10] ? 5'd10 :
                 reg_a[9]  ? 5'd9  :
                 reg_a[8]  ? 5'd8  :
                 reg_a[7]  ? 5'd7  :
                 reg_a[6]  ? 5'd6  :
                 reg_a[5]  ? 5'd5  :
                 reg_a[4]  ? 5'd4  :
                 reg_a[3]  ? 5'd3  :
                 reg_a[2]  ? 5'd2  :
                 reg_a[1]  ? 5'd1  :
                             5'd0  ;

      assign Log2Floor = {27'd0, t};
  end
endfunction
```

FIG. 3A

```
function Clamp[31:0]
    input [31:0] min, max, value;

    begin

    if ( value > max)
      clamp_value = max;
    else if ( value < min )
      clamp_value = min;
    else
      clamp_value = value;

   assign Clamp= clamp_value;

}
```

FIG. 3B

```
function GetPacketTiming[63:0]
   input [31:0] timestamp_1, timestamp_2, timestamp_3, timestamp_4;
   input [31:0] delay_select;

   begin

   logic [23:0] rtt_24b;
   logic [23:0] timing_24b;

   assign rtt_24b = timestamp_4 - timestamp_1;
   assign rtt = {8'b0, rtt_24b};

   // kFull = 0,
   // kFabric = 1,
   // kForward = 2,
   // kReverse = 3,

   assign timing_24b = (delay_select[1:0] == 0) ? rtt_24b :
                       (delay_select[1:0] == 1) ? rtt_24b - (timestamp_3 - timestamp_2) :
                       (delay_select[1:0] == 2) ? (timestamp_2 - timestamp_1) :
                                                  (timestamp_4 - timestamp_3);
   assign timing = {8'b0, timing_24b};

   assign GetPacketTiming = {rtt, timing};
}
```

FIG. 3C

HARDWARE ARCHITECTURE OF CUSTOM CORE FOR CONGESTION CONTROL

CROSS-REFERENCE TO RELATED APPLICATIONS

This application claims the benefit under 35 U.S.C. § 119 (e) of the filing date of U.S. Patent Application No. 63/525,462, for HARDWARE ARCHITECTURE OF CUSTOM CORE FOR CONGESTION CONTROL, which was filed on Jul. 7, 2023, and which is incorporated here by reference.

BACKGROUND

The Internet protocol suite is a set of communication protocols used for servicing data transmissions between devices communicating information over the Internet or other computer networks. Transmission Control Protocol ("TCP") is a part of the Internet protocol suite that provides for connection-oriented, reliable, and ordered delivery of a stream of data packets between, for example, a web-browser application running on a client device and a web-server application running on a server device over a local or wide area network. Currently, datacenters using communication protocols such as TCP encounter certain issues. For instance, incast is a many-to-one communication pattern commonly found in datacenters, which may result in incast congestion when multiple synchronized computing devices send data to the same receiver computing device in parallel. Further, because the current communication protocols require ordered delivery of packets over a connection, a long tail latency, which is the amount of time for the last few packets among a series of packets to be transmitted, may prevent transmission of the next series of packets.

BRIEF SUMMARY

The present disclosure provides a custom processor core that may be used for congestion control in transport protocols. Such transport protocols may employ a connection-oriented architecture that provides reliable packet delivery over a lossy and out-of-order network. Congestion control in such networks provides, on a per-connection basis, rate/retransmission parameters in reaction to network/endpoint congestion signals. The custom processor core may be programmable and may be used to implement state-of-the-art congestion control protocols or algorithms, such as Swift, data center TCP (DCTCP) or bottleneck bandwidth and round-trip time (BBR). The hardware architecture of the custom processor core allows for custom instructions, special register sets, and datapath enhancements for accelerating congestion control algorithms to achieve higher performance, without implementing new hardware each time a congestion control algorithm is updated.

BRIEF DESCRIPTION OF THE DRAWINGS

FIGS. 3A-3C are examples of code for custom instructions for congestion control according to aspects of the disclosure.

DETAILED DESCRIPTION

Figure 1:
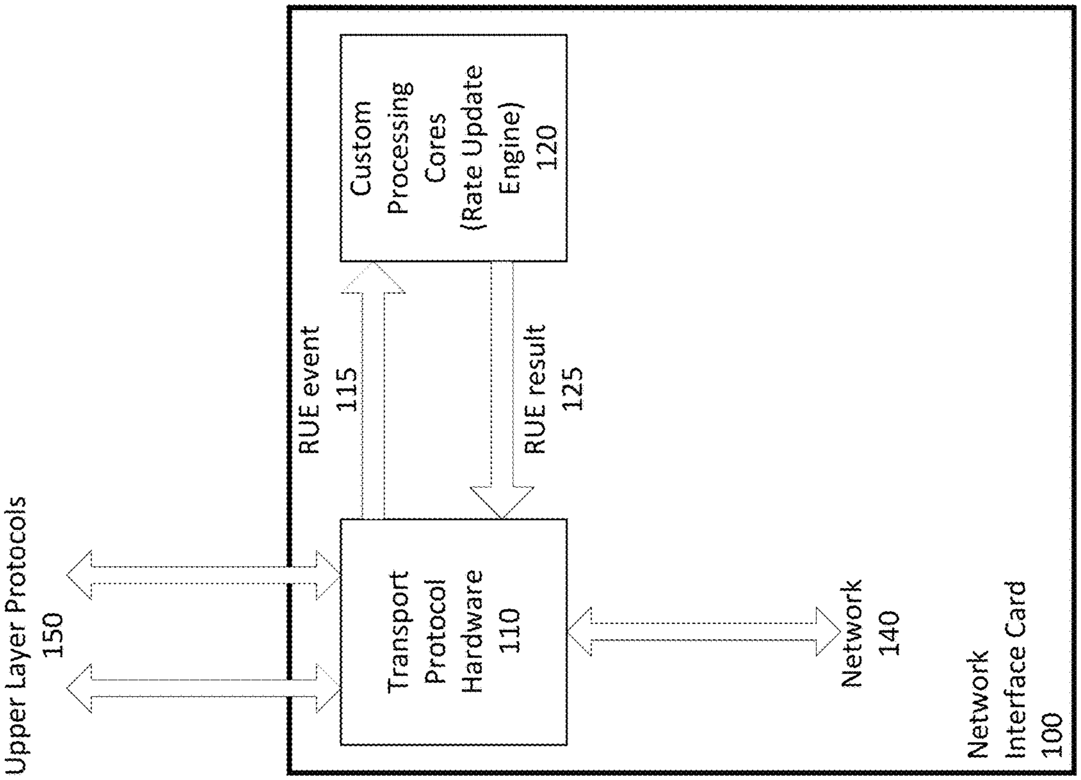
FIG. 1 is a block diagram of an example architecture implementing congestion control algorithms, according to aspects of the disclosure.

Congestion control in some transport protocols is implemented on a per-connection basis. The transport protocol hardware may provide a flexible interface to a programmable congestion control engine without prescribing any specific congestion control algorithm. As such, any congestion control algorithm, such as Swift, BBR, GCN, etc., can be employed. Hardware along the datapath of the transport protocol may be responsible for measuring various congestion signals and enforcing a rate computed by the congestion control algorithm for a connection.

A connection between devices on a network allows for data to be communicated to and from connected devices. The devices may communicate over the connections using one or more protocols. For example, reliable transport is a protocol that notifies the sources whether or not the delivery of data to an intended destination was successful. The connections can be wired or wireless, e.g., through a hardware interconnect, cables physically connecting the devices (optionally through one or more intermediate devices), or through wireless transmission. A connection may be identified by a pair of connection IDs ("CIDs"), one in each direction of communication. CIDs may be allocated by a receiver device during the connection setup process and have no global significance outside of the parties involved.

Packets may be transmitted over the connections between the source and destination devices. A packet is a basic unit of communication across a connection. A packet may have a predetermined size, for example up to a maximum transfer unit ("MTU") in length. A packet may have a header including information about the packet and its transmission, and a payload of data. For reliable transport, a reliable transport packet may include the Destination CID, such as in a header. For example, when a device B receives a packet over the connection with the Destination CID of 5, device B may identify the packet as coming from a device A and may then notify device A that the packet has been received by sending an acknowledgment over the connection referencing this packet and its CID of 5. The acknowledgment itself may be sent as a packet including the Destination CID of 10.

Host devices that are the destination or source of data transmitted over these connections can implement network interface cards (NICs) configured to manage the transmission of data across connections. NICs may also be configured to perform other functions related to connection and data transmission management, such as congestion control. Aspects of the disclosure provide for NICs or other network devices implementing custom processing cores that are customizable to implement any of various different congestion control algorithms or other processes for offloading congestion control from a host device.

A reliable transport protocol can be divided into four sub-blocks, transmission (TX), receive (RX), connection context (CTX) and the rate update engine (RUE). A connection context manager can trigger operations to be performed by the RUE, for example when certain events are identified by the manager. For example, a RUE operation may be triggered when the CTX manager identifies the receipt of ACK packets, the receipt of NACK packets, and packet retransmissions. The CTX manager is configured to generate requests for updating congestion control parameter values. The RUE computes new congestion control outputs, e.g., sliding window sizes, inter-packet gaps (IPG), and so on. A RUE response can include the congestion control outputs, for modifying how data is transmitted along the corresponding connection.

As described herein, the RUE can be updated in hardware to apply different types of congestion control algorithms for generating different congestion control outputs. The requests generated by the CTX manager as an example of RUE events. Responses generated by the RUE, e.g., the congestion control outputs, are examples of RUE responses. The responses are sent to the CTX manager, configured to adjust connections in accordance with the RUE responses, Connection contexts, e.g., information about connections between a device implementing the example architecture and other devices may be stored in a cache that is separate from the example architecture, e.g., as part of transport protocol hardware. An entry in this connection cache is brought in or evicted whenever a new connection is formed or taken out, and the connection cache manager does not wait for a RUE event to get processed before evicting a connection. Therefore, it may happen that a RUE event for a connection is still under process while the connection is already evicted from the connection context cache. The connection cache stores the context of outstanding connections towards the RUE, which may be separate from connections managed by the hardware transport layer.

Aspects of the disclosure provide for a load balancer for load-balancing RUE events to be evenly distributed across the custom cores. Events from different connections have no ordering requirement, and therefore can be processed by any core independently. If there is already an outstanding request to a core for a certain connection, the subsequent request for the same connections is processed in order (to the previous request) and therefore should also go to the same core. In a state-full RUE operation, the CTX can leave multiple RUE events outstanding, versus a state-less RUE in which the core will not have more than one event outstanding for a particular connection. Event requests can be buffered until they are fetched and provided to the cores.

Aspects of the disclosure provide for a state manager implemented by the RUE. Stateful operation according to aspects of the disclosure allows for multipathing to be supported, another feature in which a single connection between end points is associated with multiple flows, e.g., data paths. Various implementations of multipathing require tracking connection state, which can be done in hardware through the RUE. Further, the RUE can generate update congestion control parameters for each of the various flows or paths. The RUE can manage and update congestion control parameters for a connection with RUE event data characterizing the state of each flow or path operating within the connection.

FIG. 1 illustrates an example architecture in which a congestion control algorithm may be implemented. The architecture includes transport protocol hardware 110 in communication with a custom processor core implemented as part of a Rate Update Engine (RUE) 120, that is separate from the main transport protocol datapath. The transport protocol hardware 110 may provide a flexible interface to the RUE 120, and generate RUE events 115 and receive results 125 from the RUE 120. Custom processor cores as described herein can be a processing unit, such as a CPU, a GPU, or an ASIC or FPGA, configured according to aspects of the disclosure.

The transport protocol hardware 110 may be implemented between a network and one or more engines or devices implementing one or more upper layer protocols (ULPs) 150. The transport protocol hardware 110 may be for a reliable transport protocol. The reliable transport protocol may be responsible for reliable delivery of packets, congestion control, admission control, and/or ordered or unordered delivery of packets. The upper layer protocols 150 may be implemented on any of a number of hardware or software devices, including software engines that are implemented as part of the same device including the transport protocol hardware 110 and the RUE 120. For example, the upper layer protocols may be implemented as Remote Direct Memory Access (“RDMA”). As another example, the upper layer protocols may be implemented as a Non-Volatile Memory Express (“NVMe”). In some examples, a network interface card (NIC) 100 can implement some or all of the upper layer protocols 150, the transport protocol hardware 110, and/or the RUE 120. The NIC 100 can be connected to a host device (not shown), which may be a node on the network 140 communicating with other nodes that may implement respective NICs, for example as described with reference to the NIC 100.

Either the transport protocol hardware 110 and/or the RUE 120 implemented on the custom processing cores can receive and analyze incoming data packets to determine whether the rate of packet transmission along a connection should be updated. The determination can be based on, for example, predetermined thresholds of latency of data traffic volume being exceeded. Once it is determined that rate transmission parameters should be updated, the RUE 120 can determine the updated parameters in response to a generated RUE event. The specific process for congestion control can depend on the currently implemented algorithms on the custom processing cores.

The ULPs 150 can be configured for implementing a hardware/software interface, processing of messages, completion notifications, end-to-end flow control, or any combination of the above. The transport protocol hardware 110 may be used to track receipt of data packets at a target node. For instance, for a data packet pushed to the target node using the transport protocol hardware 110, the target node may send an acknowledgment message (“ACK”) to confirm receipt and placement of the data packet. Receipt may be delivered over the network connection, such as by using either the ULP 150 or the transport protocol hardware 110. In other instances, the target device may send a negative acknowledgement (“NACK”) to indicate that the target node is not ready to receive the data packet, and that the transmitting node should try resending the data packet at a later time. In the event that a NACK is received, the transmitting node may attempt retransmission of the data packet at a later time. Peer connections may be formed over the network 140 between corresponding protocols of each layer. Additionally, within each node, the ULP of each node may be configured to communicate with the RTP of the other nodes.

The ACK and NACK signals, among other factors, may be indicative of whether there is congestion at the remote node, such as if too many packets are being transmitted to the remote node from one or more transmitting nodes within too short of a duration of time. In order to address congestion, a transmitting node may adjust the rate at which data packets are transmitted to the target node.

The RUE 120 can be configured to perform any of a number of algorithms, such as Swift, BBR, GCN, etc., for performing congestion control. In this regard, the congestion control algorithm may be implemented in software, firmware, or hardware. For example, the congestion control algorithm may be implemented in any combination of host software, in firmware of the NIC 100, or in a hardware rate update engine, such as the RUE 120.

The RUE event 115 may provide one or more congestion signals. Examples of such congestion signals may include round trip time (RTT), explicit congestion notification (ECN), retransmission status, target buffer occupancy, etc. The RTT may be an accurate measurement of delay, including forward and reverse path delay. The ECN may include markings made by switches in the forward path to indicate congestion being experienced. Retransmission status may identify retransmissions for packets dropped. Such dropped packets may be due to early recovery mechanisms, timeouts, etc.

The RUE 120 may report results 125 back to the transport protocol hardware 110, based on which congestion control may be implemented. For example, the RUE results 125 may include signals such as congestion window (Cwnd), retransmission timeout (RTO), etc. Congestion window (Cwnd) may represent a total number of outstanding packets. For example, this may be a fixed-point number. When its value is between 0 and 1, the transport protocol hardware 110 applies an additional inter-packet gap to limit the number of packet transmission to be less than 1 per round-trip time (RTT). Retransmission timeout (RTO) may include retransmitting a pending packet when no acknowledgement (ACK) is received within RTO. The transport protocol hardware 110 may support updated RTO for both future packets and current pending transmission packets.

By using a custom processing core, it can be updated with programming as new congestion control algorithms evolve. Moreover, the custom processing core provides lower latency and higher performance. Customizing the processing core using custom hardware acceleration instructions, special register sets, and data path event-result handling operations allows for the processor to have a smaller physical size compared to generic processors. The proposed architecture is to offload the RUE event processing and RUE result generation for congestion control algorithms, resulting in significantly better power-performance-area (PPA) compared to generic processors. Further, the custom processing cores described herein are configured to load-balance RUE events based on inbound connections. By load-balancing the RUE events, overall efficiency is improved by balancing utilization of all available cores. Further, the load-balancing allows for the execution of various different congestion control algorithms, which may have different processing characteristics that vary expected latencies in generating RUE responses. The load-balancing as described herein enables a more predictable utilization of the processors without prior knowledge of the specific congestion control algorithm being used.

Figure 2:
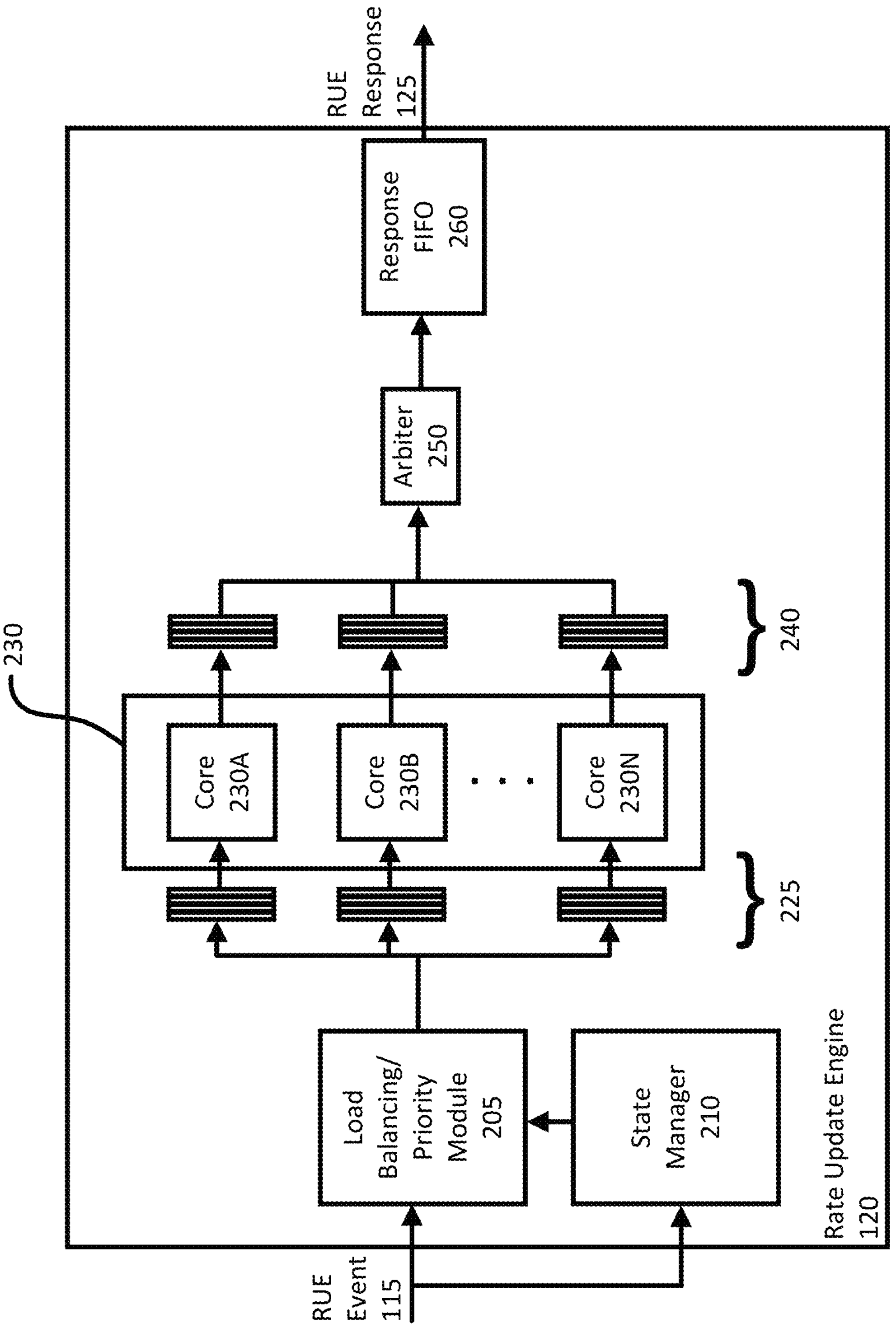
FIG. 2 is a block diagram of an example rate update engine according to aspects of the disclosure.

FIG. 2 is a block diagram illustrating a detailed view of the RUE 120 with the custom cores 230A-N. The RUE events 115 received at the RUE 120 allocated among custom cores 230 by load balancing/priority module 205. For example, the RUE events 115 may be randomly sprayed among all custom cores 230. This ensures work is load balanced efficiently across the different cores 230. According to some examples, the RUE events 115 may be temporarily stored in memory structures 220. In other examples, the RUE events 115 may be load balanced based on their associated connections, for example as described below.

The custom cores 230 can execute a congestion control algorithm. Input to the cores 230A-N can be stored in memory structure 240, load-balanced according to module 205. Results from the custom cores 230 may be stored in a memory structure 240 and loaded by an arbiter 250, such as a round robin arbiter, into a Response first-in-first-out (FIFO) register 260. In this regard, the transport protocol hardware 110 can consume and enforce updated parameters provided by the congestion algorithm.

Multiple custom cores 230, e.g., cores 230A, 230B, and 230N shown in FIG. 2, can be operated in parallel to scale RUE event processing. Using RUE load balancing mechanisms described presently, events are distributed up to all of the cores. Load balancing mechanisms implemented by the module 205 can cause events to be distributed based on whether certain events come from the same connection. In load balancing incoming events, the module 205 enforces the ordering of events per core, by load-balancing events based on related connections between enqueued events. The module 205 also tracks the connections which have events outstanding or queued with each core.

For example, events from different connections have no ordering requirement, and therefore can be processed by any core independently. For example, if the module 205 receives events A and B from different connections, the module 205 can schedule event A to one core for processing, and event B to a second core for processing. When a new event is received, the module 205 checks to see if other events from the same connection as the new event have been scheduled, and if so, schedules the new event to the same core.

As another example, if there is already an outstanding request to a core for a certain connection, subsequent requests from the connection are processed in order to the previous request and should go to the same core. For example, two events A and B are produced on the same connection. Event A is received by the module 205 and scheduled for processing on core A. Afterwards, Event B is received by the module 205. As event B is subsequent to event A on the same connection, the module 205 also schedules event B to core A.

As another example, in addition to managing events based on shared connections or independence as described above, the module 205 balances events across all cores, so as to not over- or under-utilize any particular core at any time. For example, when multiple possible cores are available for scheduling based on the load balancing mechanisms described herein, the module 205 can select the core with the lowest current utilization. If there is a tie between the events, the module 205 can randomly select a core or select a core according to a round-robin or other format.

Module 205 is configured to buffer incoming RUE events before sending to cores A through N. The module 205 can send the events to their respective destination cores in bursts of one or more events. The module 205 can be configured for maintaining the ordering of events per core, while the same or another module, such as state manager 210, is configured to assign events to various cores, for example in accordance with the rules described above. When the state manager 210 is configured to assign events to the custom cores, the state manager can store information related to received events. This tracking information can be stored in a CAM, hash table, or other data structure implemented as part of the state manager 210 (not shown).

The custom cores 230 may be programmed with custom instructions. Such instructions may correspond to operations that would be needed to perform congestion control. By customizing instructions for such operations, congestion control operations can be expedited. Some examples of custom instructions are provided in FIGS. 3A-3C. For example, the custom cores 230 can be implemented with an instruction set architecture defining instructions that can be used to program custom instructions for performing operations for congestion control.

FIG. 3A illustrates an example "Log 2Floor" instruction. This instruction may be used to compute a logarithm of a given value to a base of 2, rounded down. The value corresponds to a highest non-zero bit. These and other instructions can be performed more efficiently in hardware to accelerate implementation of various congestion control algorithms that rely on the execution of these instructions. For example, executing some congestion control algorithms requires inputting or processing logarithms.

FIG. 3B illustrates an example "clamp" instruction. The clamp instruction may be used to restrict a number between two other numbers. If a given number is within a specified range, that given number will retain its value. However, if the given number is below a minimum value for the specified range, the value of the given number will be adjusted to the minimum for the specified range. Similarly, if the given number is greater than a maximum of the specified range, the value of the given number will be adjusted to the maximum for the given range. A clamp instruction can be used as part of generating a congestion window. FIG. 3C illustrates an example of a GetPacketTiming function. This function obtains timing information related to a packet. Examples of such timing information include round trip time (RTT).

Some examples of other functions, though not illustrated in the figures, include a GetSmoothed function, Dividers, Multipliers, etc. The GetSmoothed function may include instructions that are used to find an exponential weighted moving average. The Divider function may supplement existing available dividers, e.g., with instructions for dividing numbers. Similarly, the Multiplier function may supplement existing available multipliers, e.g., integer multiplication, floating-point multiplication, and so on.

In addition or alternative to the custom instructions, very large instruction words (VLIW) may be implemented. For example, multiple independent instructions can be executed in parallel in order. A custom architecture, such as described in connection with FIG. 4, may identify optimal instructions for each of a plurality of parallel execution pipelines. The total number of execution pipelines provides for tradeoff between performance and physical space consumed.

Figure 4:
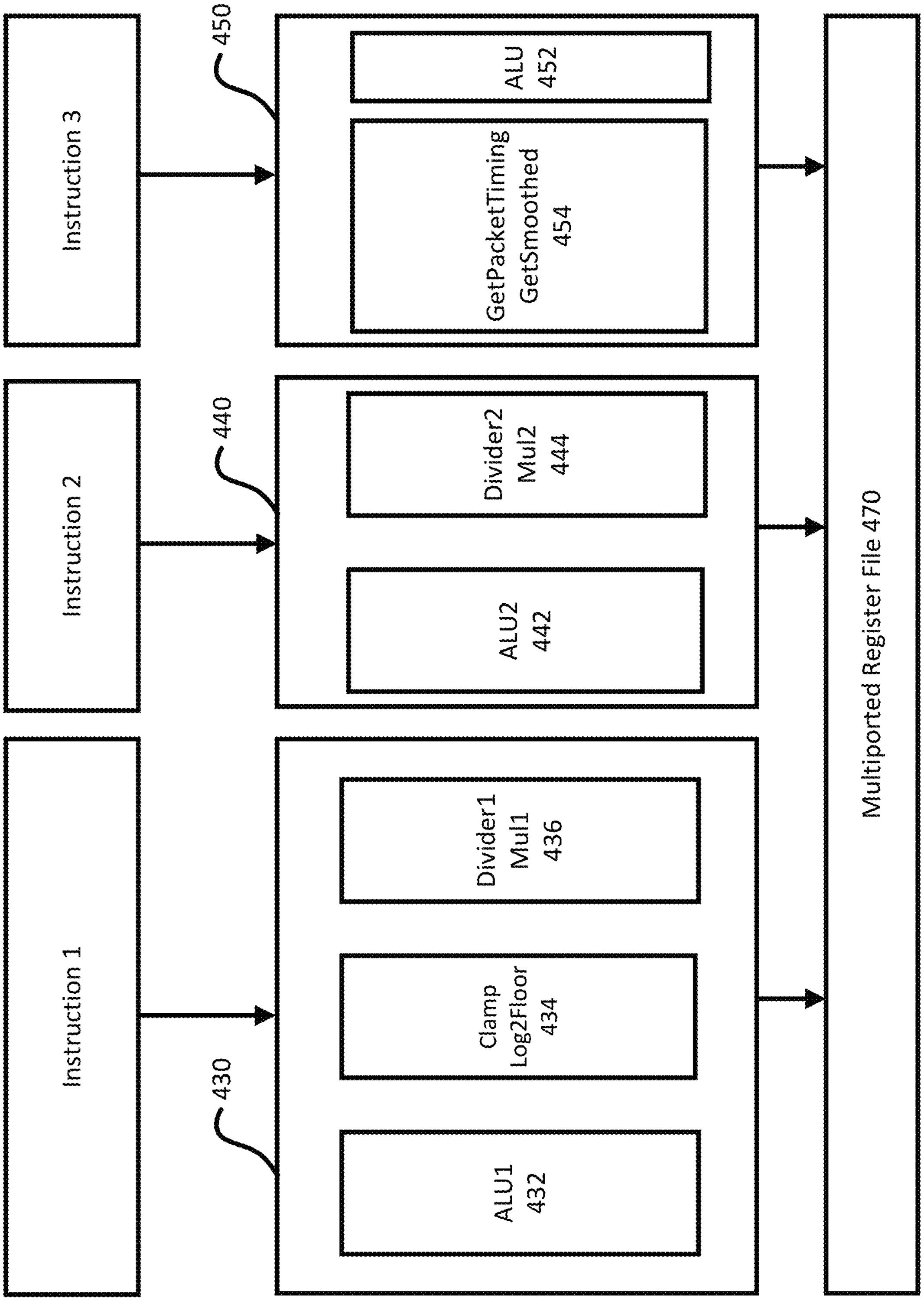
FIG. 4 illustrates an example architecture for parallel execution of independent instructions for congestion control, according to aspects of the disclosure.

FIG. 4 illustrates an example architecture for parallel execution of independent instructions. As shown, the architecture includes a core having three independent execution functional units 430, 440, 450, but it should be understood that the number of execution functional units may be modified. Each of the execution functional units 430, 440, 450 can be a processing unit dedicated to performing different types of congestion control instructions. Each processing execution functional unit may include one or more computational units. For example, each execution functional unit 430, 440, 450 may include a respective arithmetic logic unit (ALU) 432, 442, 452. Moreover, each execution functional unit 430, 440, 450 may include one or more additional computational units dedicated to processing specific types of instructions. In the example shown, first execution functional unit 430 further includes a Clamp/Log 2Floor unit 434 and a divider/multiplier unit 436. The Clamp/Log 2Floor unit 434 may be dedicated to processing Clamp and Log 2Floor instructions, while the divider/multiplier unit 436 is dedicated to processing divide and multiply instructions. Second execution functional unit 440 may further include divider/multiplier unit 444. Third execution functional unit 450 may further include GetPacketTiming/GetSmoothed unit 454 dedicated to processing GetPacketTiming and GetSmoothed operations. While a few examples of computational units dedicated to processing different types of instructions are shown, it should be understood that additional, fewer, or different computational units may be implemented depending on types of instructions to be processed.

As shown, the execution functional units 430, 440, 450 independently execute instructions in parallel. For example, the first execution functional unit 430 executes Instruction 1, while second execution functional unit 440 executes Instruction 2 and third execution functional unit 450 executes Instruction 3. Instructions may be funneled to a particular execution functional unit depending on the type of instruction. For example, all Clamp and Log 2Floor instructions may be sent to the first execution functional unit 430 for processing because of its inclusion of the Clamp/Log 2Floor processing unit 432. Divide or multiple instructions may be sent to either the first execution functional unit 430 or the second execution functional unit 440. GetPacketTiming and GetSmoothed instructions may all be sent to the third execution functional unit 450 because of its inclusion of the GetPacketTiming/GetSmoothed processing unit 454.

Allocation of instructions to the appropriate execution functional unit may be performed by any of a variety of mechanisms or components. For example, a compiler or assembler may convert high level software code (e.g., in C, C++, etc.) to a low-level stream of instructions to the processor. The compiler or assembler may have an awareness of the capabilities of each execution functional unit and may set up the instructions in such a way that the instructions would only be enabled for the correct execution functional pipeline.

The architecture may further include a multiported register file 470. The register file may be made to cater to specific needs of congestion control algorithms. For example, the multiported register file 470 may include a number of registers, with each specific to some aspect of the congestion control algorithm.

Another aspect of custom core may include memory enhancements. An Instruction Memory may be a static random access memory (SRAM) memory which can fit all the instructions required for the congestion control algorithms on chip without having to fetch the instructions through cache/dynamic random access memory (DRAM) memory hierarchies. According to some aspects of the present disclosure, the instruction memory may be shared between a pair of custom cores, reducing the area footprint of the instruction memory.

Figure 5:
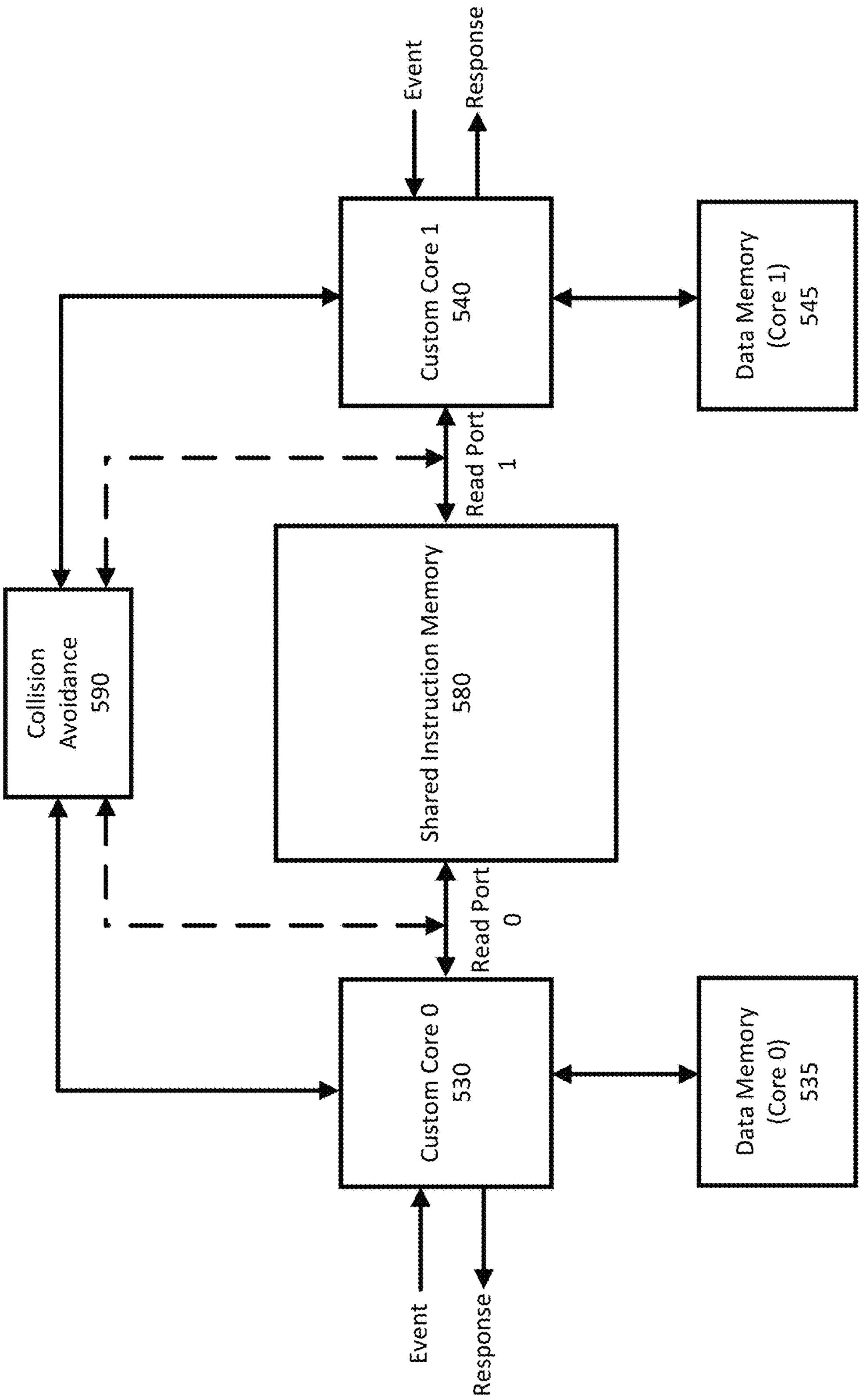
FIG. 5 illustrates an example architecture including a shared instruction memory, according to aspects of the disclosure.

FIG. 5 illustrates an example architecture including a shared instruction memory 580. The shared instruction memory 580 may include two or more read ports, wherein each custom core 530, 540 sharing the shared instruction memory accesses the shared instruction memory 580 through a separate port. Each custom core 530, 540 may have its own data memory 535, 545, respectively.

The shared instruction memory 580 provides instructions to two separate custom cores 530, 540. In some instances, both the cores 530, 540 may be fetching the same instruction. For example, the same read address may be requested by both cores 530, 540. If this happens every cycle, all the memories are enabled every cycle due to the XOR structure of the shared instruction memory. Such address collision leads to significantly higher power consumption. Collision avoidance module 590, e.g., a module configured to implement a collision avoidance algorithm, may mitigate such address collisions. For example, to reduce the power consumed, the collision avoidance module 590 snoops read addresses from both cores 530, 540. If it finds both the cores 530, 540 are reading the same memory location for multiple cycles, e.g., two or more cycles, it issues a stall to one of the processors. The stall may be a pause, such as for one or more cycles. This skews the instruction fetch between the two cores 530, 540 and avoids the address collision, resulting in lower power consumption.

Figure 6:
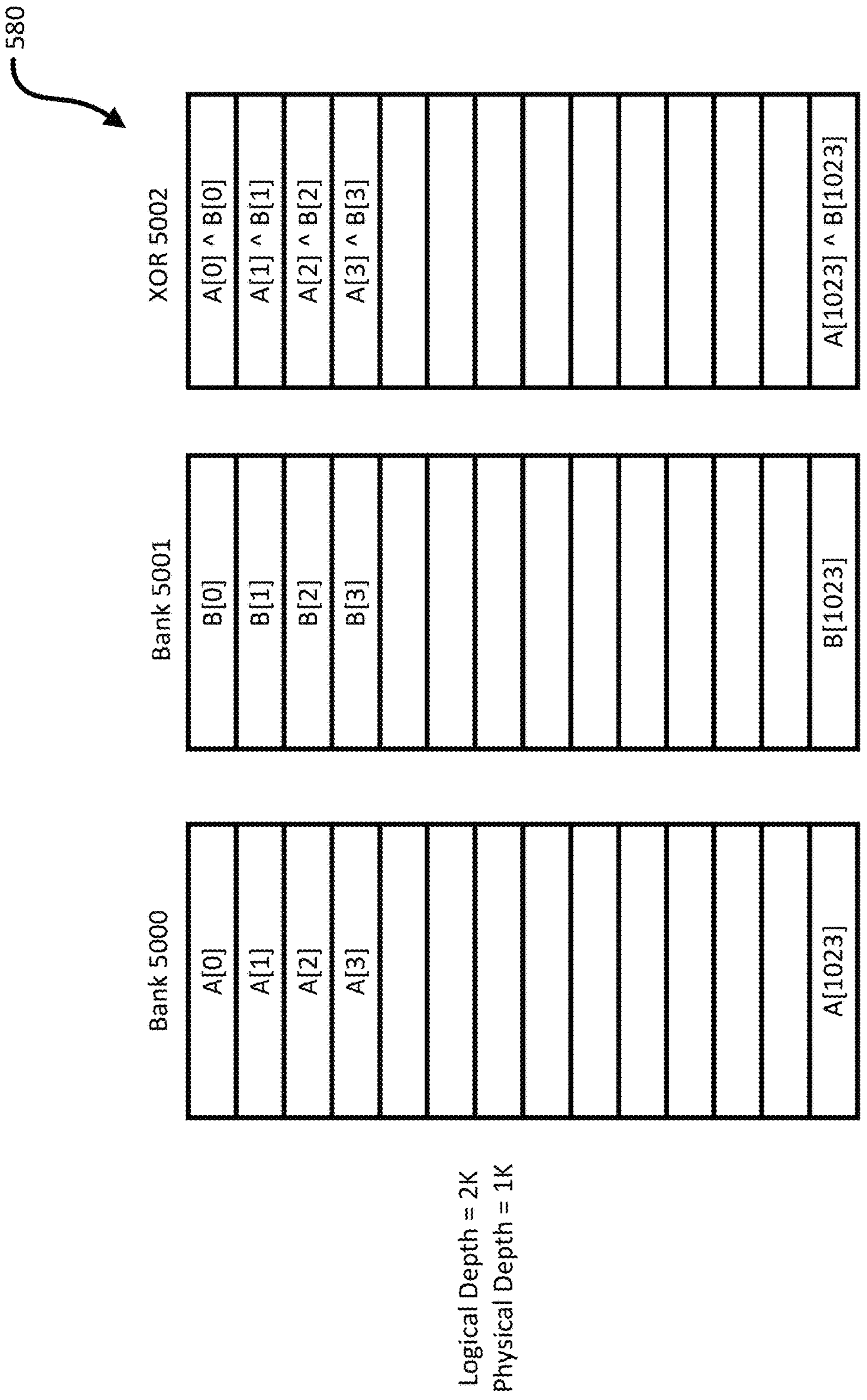
FIG. 6 illustrates further example details of the shared instruction memory according to aspects of the disclosure.

FIG. 6 illustrates an example of the shared instruction memory. The memory may be partitioned into several physical banks 5000, 5001 and an additional XOR bank 5002. For example, a 2K deep logical memory may be partitioned into two 1K deep physical memories. For each row of the XOR memory bank 5002 the value written to the memory is X[i]=A[i]^B[i]. Each write operation requires 2 cycles, 1 cycle to read all the memories and 1 cycle to write to the bank and the XOR bank.

Figure 7:
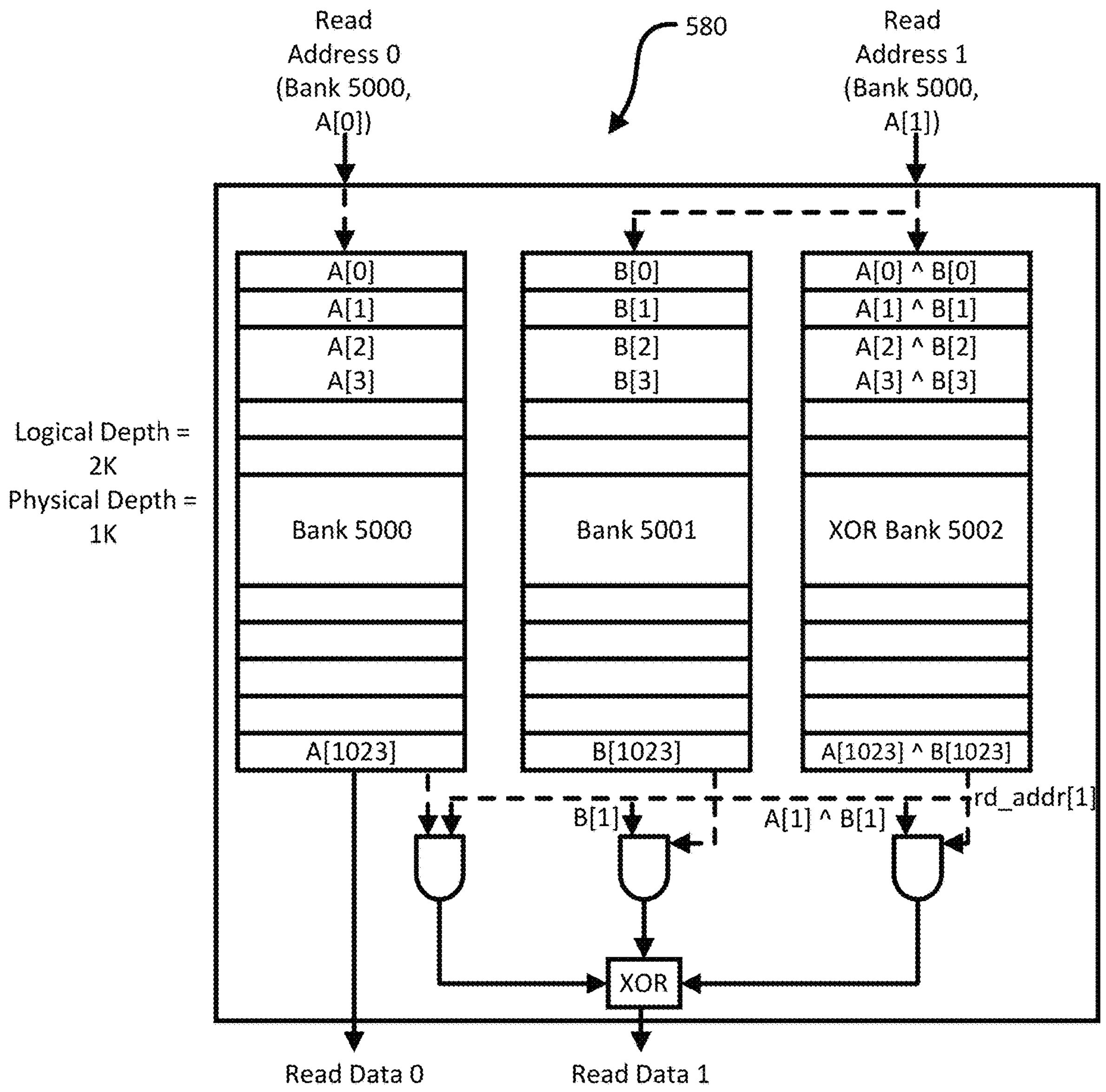
FIG. 7 illustrates an example of reading data from different banks of the shared instruction memory according to aspects of the disclosure.

FIG. 7 illustrates an example of reading data from the different banks of FIG. 6. When the 2 read ports request read data from addresses in different banks, the data can be fetched from each of the physical memory banks 5000, 5001. In case of a collision, where the read ports request data from 2 different addresses which are in the same bank, the first requestor 1 accesses the primary physical bank, based on logical to physical memory mapping, e.g., rd_addr[1]. The second requestor reads all other memory banks and the data is ANDed and then XORed to compute the read data, e.g., A[i]=B[i]^X[i], where X[i] is the read address from the first requestor, e.g., rd_addr[1]. In case of collisions where the two read ports access the same bank, the performance is not degraded. However, every time there is a bank collision, it would require reading from all the physical banks incurring higher power usage.

The algorithmic memory may support two read operations every cycle. Each write operation may take two clock cycles: 1 cycle to read all the banks and 1 cycle to update the data in the primary bank and XOR bank.

While two bank partitions are described in the examples above, it should be understood that a different number of partitions may be used. For large memory structures where physical design limitations require partitioning of the logical memory to smaller physical structures, memory density should not be affected due to the bank partitioning.

Bank collision may be avoided in a variety of ways. One example includes address collision detection. In this example, address collision detection logic detects if both custom cores are using the same address resulting in bank collisions. In such instances, the address collision detection logic asserts a single cycle stall to the core to break the unintended synchronization between the two cores. Another example for bank collision avoidance is bank rotation. In this example, each of the most significant bits of the addresses presented to the memory are hashed using a simple hash function to generate a unique value per row. The physical bank to access is determined by the logical bank address plus the hash value, which randomizes the bank accesses resulting in lower bank collision.

Figure 8:
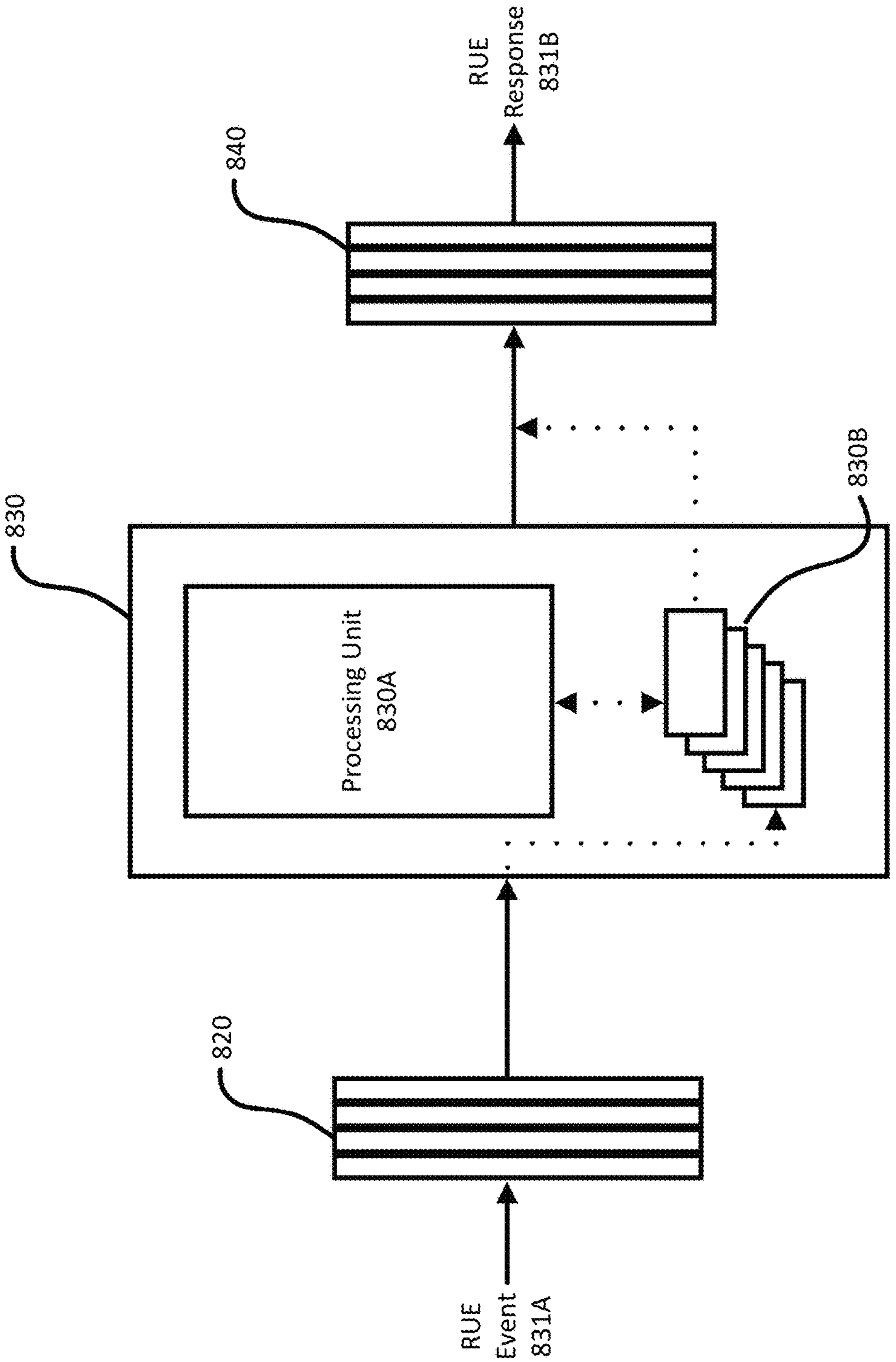
FIG. 8 illustrates an example register file according to aspects of the disclosure.

FIG. 8 illustrates an example register file, including custom state registers for event fields and response fields. Congestion control algorithms may require access to the congestion signals received in the event transaction. Similarly based on the current state of a given connection, the calculated response fields may be stored. Providing additional registers for the event and response fields reduces the overhead of register spillover to memory, significantly improving the performance.

Similar to FIG. 2 described above, FIG. 8 shows processor 830 with CPU core 830A and registers 830B. RUE events, such as RUE event 831A, are stored in RUE event memory 820, from which they can be retrieved by the custom core 830 for processing. After processing, the custom core 830 writes RUE response 831B to RUE response memory 840. The RUE event 831A and RUE response 831B may have sub fields, such as Cwnd, RTO, Delay, etc. The custom core 830 may have dedicated custom state registers, e.g., registers 830B for these sub fields. RUE event sub fields are fetched and stored in these dedicated special registers. Similarly, after processing, the RUE response sub fields are stored in their dedicated special registers. The RUE response memory 840 may be loaded with the computed values from the special registers for the RUE response fields after all processing is done and when the RUE response is ready to be sent to transport protocol hardware.

While the foregoing description provides examples of an architecture of the custom core for congestion control, example methods are now described that may be performed utilizing the hardware architecture. While the operations of such methods are described in a particular order, it should be understood that the order of operations may be modified. Moreover, operations may be added or omitted.

Figure 9:
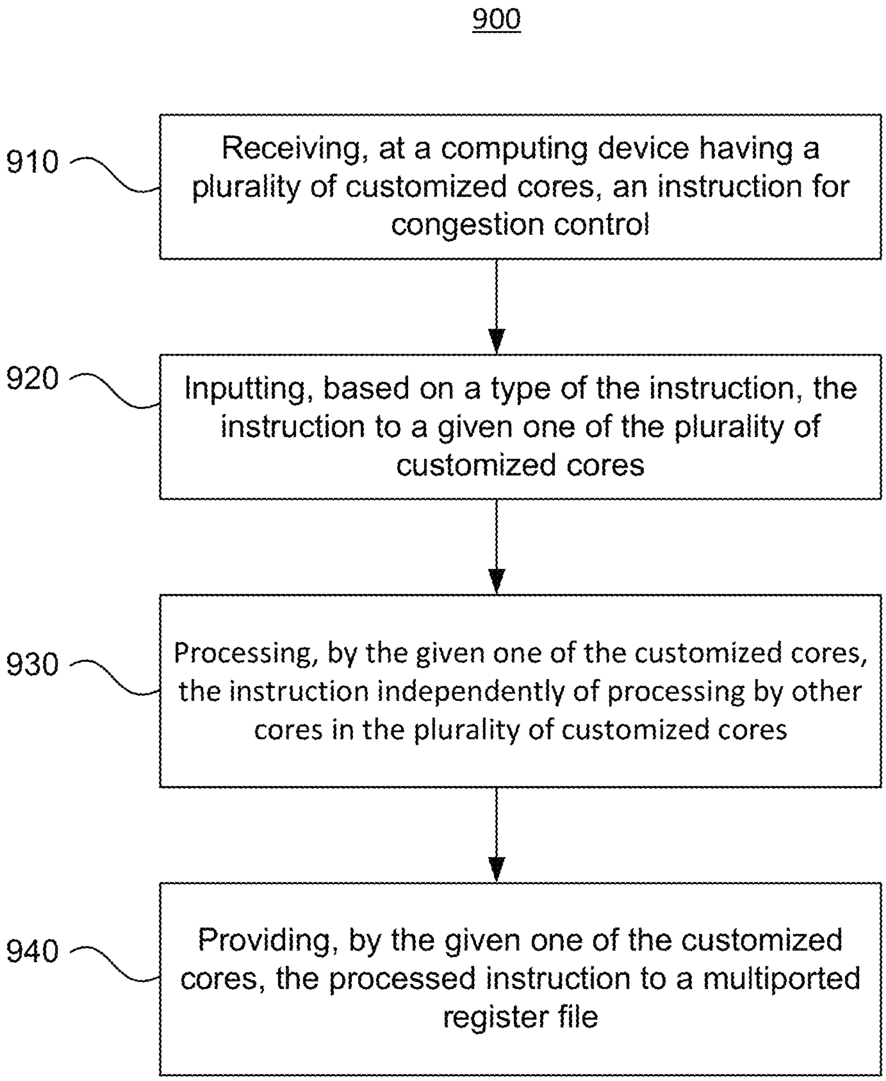
FIG. 9 is a flow diagram illustrating an example method according to aspects of the disclosure.

FIG. 9 is a flow diagram illustrating an example method 900 according to aspects of the disclosure. As shown in block 910, an instruction for congestion control is received at a computing device having a plurality of customized cores. In block 920, based on a type of the instruction, the instruction is input to a given one of the plurality of customized cores. In block 930, the given one of the customized cores processes the instruction independently of processing by other cores in the plurality of customized cores. In block 940, the given one of the customized cores provides the processed instruction to a multiported register file.

Figure 10:
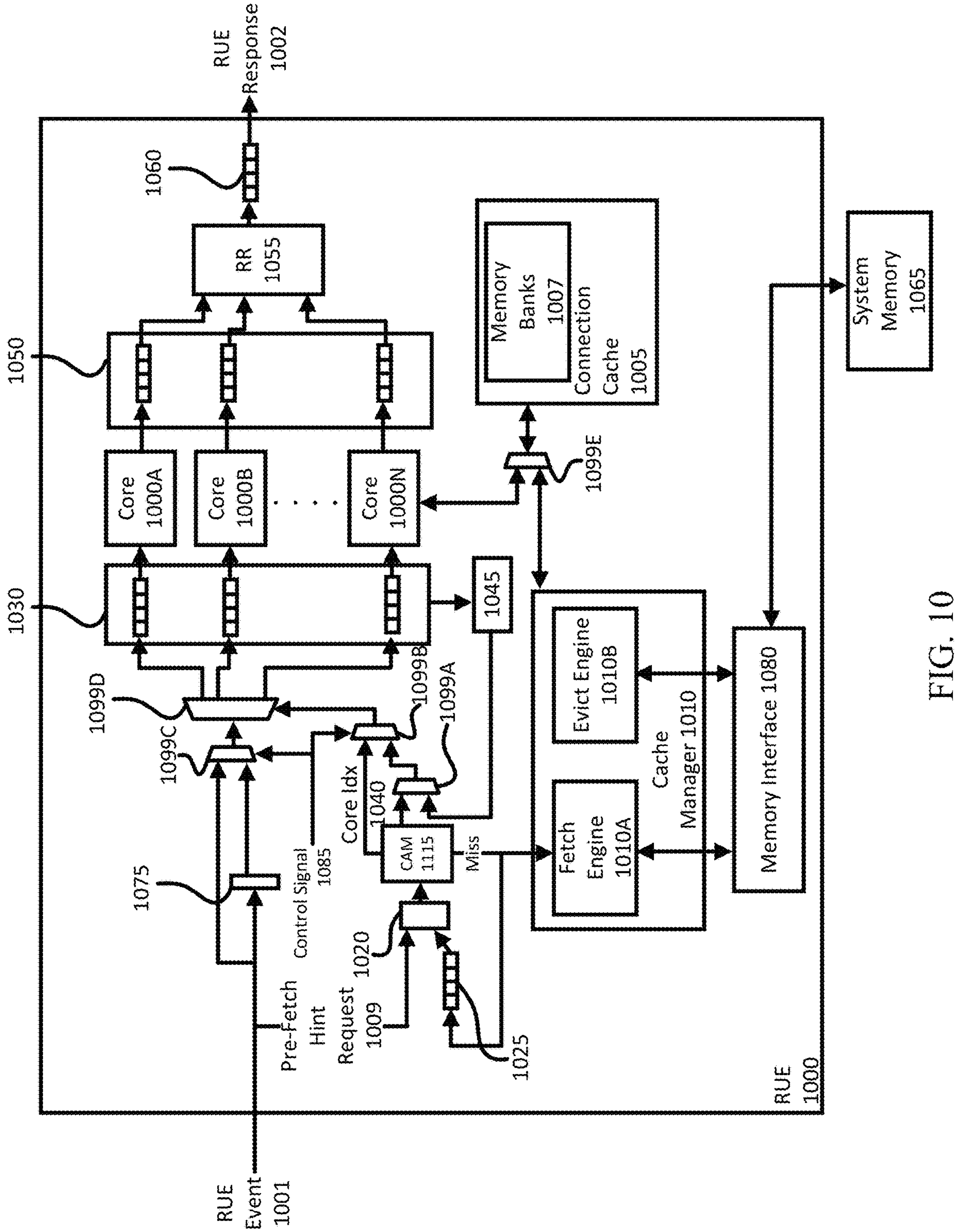
FIG. 10 is a block diagram of an example rate update engine implementing state cache management, according to aspects of the disclosure.

FIG. 10 is a block diagram of an example rate update engine 1000 implementing state cache management, according to aspects of the disclosure. For example, rate update engine 1000 may be implemented according to the description with reference to FIG. 2 and RUE 120, with elements shown in FIG. 10 implemented as part of state manager 210. The RUE engine 1000 works on congestion control state ("CC-state") presented in RUE events, such as RUE event 1001. The RUE outputs RUE responses, such as RUE response 1002. The RUE 1000 maintains a connection cache 1005 of connection states, which can be further backed up by system memory 1065 accessible to the RUE 1000.

CC-state can include any information needed for performing a congestion control algorithm for generating updated congestion control parameters for a connection. For example, CC-state information can include connection latency, number packet drops, congestion window size, etc. CC-state information can specify information related to the congestion of a connection, for each flow or path on the connection. Some congestion control algorithms factor in the state of different flows or paths of a connection before generating updated congestion control parameters. By maintaining the state of each flow, these algorithms can be executed more effectively, at least because each flow can be taken into account for generating updated congestion control parameters to reduce congestion on a connection.

The connection cache 1005 can be implemented alongside content-addressable memory (CAM) 1115, with system memory backing up the CC-state data in SRAM, as examples. Manager 1010 is configured with fetch engine 1010A and eviction engine 1010B for fetching and evicting connections, respectively, to and from the connection cache 1005. The connection cache 1005 can be divided into multiple SRAM banks 1007, with each of the cores A through N interfacing with one or more of the banks 1007. The fetch engine 1010A is configured to write to the connection cache 1005 when fetched data from system memory (not shown) arrives. The eviction engine 1010B reads the connection cache 1005 and writes to system memory. The eviction engine 1010B evicts CC-states from the connection cache 1005, based on, for example, whether the cache occupancy exceeds a predetermined threshold, the corresponding connection to the CC-state has no outstanding RUE responses, and/or if the connection is not active. The RUE event 1001 can include an identifier for comparing to identify a corresponding CC-state, either in system memory or the connection cache 1005.

While a CC-state is present in the connection cache 1005, the CC-state is managed, e.g., updated, written to, read from, the cores A through N. The connection cache 1005 can be accessed through LOAD or STORE instructions, defined according to an instruction set architecture for the custom cores, according to aspects of the disclosure. In some examples, the contents of the connection cache 1005 are accessible through PUSH and POP instructions, for example to PUSH an address to the cache 1005 and then POP the cache 1005 to read the contents. For writing data, a PUSH instruction can write data to the cache 1005 at a specified address.

A connection ID from RUE event 1001 is looked up in the CAM 1115 to determine if the connection is present in the connection cache 1005. Events which HIT in the CAM 1115 are sent to core queues 1030. The core queues 1030 can include one or more respective queues of RUE events for processing on a corresponding cores A through N. Core queues 1030 can be accessed by the cores 1000A through 1000N, for example through defined PUSH and POP instructions, such as the instructions described above with reference to the connection cache 1005.

The CAM 1115 can track information about the position of various RUE events received by the RUE 1000. For example, the CAM 1115 can track RUE events in the missing queue 1025, per connection. Other information the CAM 1115 can track which events are outstanding, e.g., haven't been processed, which fetch requests are pending, whether a connection is active, and the core ID of cores assigned to each request.

Events which MISS in the CAM 1115 are pushed into missing queue 1025. Missing queue 1025 can be implemented as one or more queues, for example as linked list queues. The depth of the queue 1025 can cover the system memory read latency with the number of queues equal to the depth of the missing queue 1025. The fetch engine 1025A fetches the CC-state for the enqueued event from system memory and writes the CC-state to the connection cache 1005. The missing queue 1025 can dequeue a RUE event after the corresponding CC-state is fetched, and forwarded to the core queues 1030.

Arbitrator circuit 1020 can select between dequeuing a RUE event from the missing queue 1025 and selecting the RUE event 1001 or pre-fetch request 1009 for passing to the CAM 1115. For example, if the missing queue 1025 is not empty, the arbitrator circuit 1020 is configured to dequeue an event from the queue 1025, otherwise receives and forwards RUE events 1001 or pre-fetch request 1009.

The cache manager 1010 fetches the CC-state data for the missed event from the connection cache 1005. To increase the chance of a HIT, a pre-fetch hint request 1009 can come before the RUE event, which the cache manager receives for fetching the corresponding CC-state before the RUE event arrives. A pre-fetch hint request can be generated as part of a connection becoming active, e.g., to indicate that a request to fetch a corresponding CC-state is likely to occur. A pre-fetch hint can also be issued whenever a connection is evicted from the hardware transport layer of another system configured for issuing RUE events. The fetch engine 1010A is configured to fetch CC-states from system memory in the event of a MISS in the CAM 1115, and/or in response to a pre-fetch request 1009. In response to a MISS, the cache manager 1010 allocates a cache index from a free list and installs the cache index in the CAM 1115 where the fetched CC-state is cached. The cache index is also forwarded to the cores 1000A through 1000N. RUE responses from the cores 1000A-1000N include the cache index, which is used to update the connection cache 1005. As a single state manager is used for all the cores 1000A-1000N, coherency issues are eliminated as there is just one component managing reads and writes to the connection cache 1005.

In some examples, pre-fetch request 1009 can be a pre-eviction request, for evicting CC-state data for a connection. Referring to transport protocol hardware 110, the hardware can be configured to send pre-fetch or pre-eviction requests in response to generating or deleting connections, respectively. By sending requests before RUE events occur, the RUE can operate more efficiently, for example because there are fewer cache misses when searching for CC-state data. The cache requirement for the RUE can also be reduced, for example because pre-eviction requests can cause CC-state data to not be stored for connections that have already been deleted (and therefore will not generate new RUE events). Core queues 1030 output a next core identifier 1045, which is used by the RUE 1000 for determining the next core to assign a RUE event to, by ID. The next core identifier 1045 can be the core with the lowest given occupancy at the time the identifier 1045 is emitted. Output queues 1050 receive RUE responses generated by the cores 1000A-N, which is passed to a round-robin module 1055. The round-robin module 1055 is configured to output RUE responses in a round-robin fashion, taken from each core in turn. In other examples, other approaches are used to determine the order at which RUE responses are enqueued in response queue 1060. For example, the output from the round-robin module 1055 may be random or weighted.

As shown in FIG. 10, the RUE 1000 can include a number of connection circuits 1099, which can be, for example, multiplexers. The connection circuits 1099A, 1099B, 1099C, and 1099D. are configured to route or multiplex incoming signals to their respective destination, allowing for multiple source elements to communicate with the same destination element, and vice versa. Collectively, elements 1115, 1030, 1040, 1045, 1099A, 1099B, 1099C, and 1099D can form at least part of module 205.

Connection circuit 1099A can receive the next core identifier 1045 and a code identifier 1040 from CAM 1115. If the CAM 1115 identifies a core, the 1099A selects and forwards the identifier 1040, otherwise, the circuit 1099A forwards the core identifier 1045 with the current least occupancy. The CAM 1115 may forward a core identifier, for example, that identifies the core which has already been assigned processing an earlier RUE event for the same connection as the currently received RUE event.

Connection circuit 1099B can receive the output of 1099A and control signal 1085. Control signal 1085 can be generated and received through software to optionally override some load-balancing operations performed as described herein. For example, if a control signal 1085 is received by connection circuit 1099B or 1099C, the connection circuits forwards the value of the control signal, overwriting whatever the output from those circuits would have been. For example, if control signal 1085 is received by the connection circuit 1099B with a core identifier to overwrite the output of connection circuit 1099A, then connection circuit 1099B outputs the core identifier value in the control signal 1085.

Similarly, connection circuit 1099C can forward the RUE event 1001 to connection circuit 1099D, in response to receiving control signal 1085. Without the control signal 1085, RUE event 1001 is forwarded to connection circuit 1099C after waiting for a number of cycles in delay circuit 1075. The RUE event 1001 is delayed to wait for the CAM 115 to return a core identifier, to forward along with the RUE event 1001 to the connection circuit 1099D. If the core identifier is overwritten, for example by control signal 1085, delaying the RUE event 1001 is not needed, and the delay circuit 1075 can be bypassed.

Connection circuit 1099D is configured to forward the RUE event 1001 to the queue corresponding to the core identified by the core identifier. Connection circuit 1099E selects between communication with the cache manager 1010 accessing the connection cache 1005, with cache accesses by the cores 1000A-1000N. State manager 210 can include the connection cache 1005, connection circuit 1099E, cache manager 1010, and CAM 1115. Memory interface 1080 can be configured for communicating data between the cache manager 1010 and the system memory 1065.

The system and methods described herein are advantageous in that they provide an optimization between processing speed and power, and physical space consumed by processing components. By dedicating computing cores to specific congestion control instructions, congestion control algorithms can be computed at faster speeds.

Aspects of this disclosure can be implemented in digital electronic circuitry, in tangibly-embodied computer software or firmware, and/or in computer hardware, such as the structure disclosed herein, their structural equivalents, or combinations thereof. Aspects of this disclosure can further be implemented as one or more computer programs, such as one or more engines or modules of computer program instructions encoded on one or more tangible non-transitory computer storage media for execution by, or to control the operation of, one or more data processing apparatus.

The NIC 100 and other devices of the network 140 can be capable of direct and indirect communication over the network. Devices of the network 140 can set up listening sockets that may accept an initiating connection for sending and receiving information. The network 140 itself can include various configurations and protocols including the Internet, World Wide Web, intranets, virtual private networks, wide area networks, local networks, and private networks using communication protocols proprietary to one or more companies. The network 140 can support a variety of short- and long-range connections. The short- and long-range connections may be made over different bandwidths, such as 2.402 GHz to 2.480 GHZ (commonly associated with the Bluetooth® standard), 2.4 GHZ and 5 GHZ (commonly associated with the Wi-Fi® communication protocol); or with a variety of communication standards, such as the LTER standard for wireless broadband communication. The network 140, in addition or alternatively, can also support wired connections between the devices, including over various types of Ethernet connection.

A computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus. A computer program may, but need not, correspond to a file in a file system. A computer program can be stored in a portion of a file that holds other programs or data, e.g., one or more scripts, in a single file, or in multiple coordinated files, e.g., files that store one or more engines, modules, sub-programs, or portions of code.

The term "configured" is used herein in connection with systems and computer program components. For a system of one or more computers to be configured to perform particular operations or actions means that the system has installed software, firmware, hardware, or a combination thereof that cause the system to perform the operations or actions. For one or more computer programs to be configured to perform operations or actions means that the one or more programs include instructions that, when executed by one or more data processing apparatus, cause the apparatus to perform the operations or actions.

Host devices for receiving and transmitting data through a NIC can refer to data processing hardware and encompasses various apparatus, devices, and machines for processing data, including programmable processors, a computer, or combinations thereof. The data processing apparatus can include special purpose logic circuitry, such as a field programmable gate array (FPGA) or an application specific integrated circuit (ASIC), such as a Tensor Processing Unit (TPU). The data processing apparatus can include code that creates an execution environment for computer programs, such as code that constitutes processor firmware, a protocol stack, a database management system, an operating system, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "engine" can refer to a software-based or hardware-based system, subsystem, or process that is configured to perform one or more specific functions. The engine can be implemented as one or more software modules or components or can be installed on one or more computers in one or more locations. A particular engine can have one or more processors or computing devices dedicated thereto, or multiple engines can be installed and running on the same processor or computing device. In some examples, an engine can be implemented as a specially configured circuit, while in other examples, an engine can be implemented in a combination of software and hardware.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers. While operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the examples described above should not be understood as requiring such separation in all examples, and it should be understood that the described program components and systems can be integrated together in one or more software or hardware-based devices or computer-readable media.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Implementations of the present technology can each include, but are not limited to, the following. The features may be alone or in combination with one or more other features described herein. In some examples, the following features are included in combination:

(1) A system, including: a first core having a first computing unit dedicated to processing congestion control instructions of one or more first types; a second core having a second computing unit dedicated to processing congestion control instructions of one or more second types, the first and second cores operating independently of one another; and a register file in communication with each of the first core and the second core and adapted to receive processed instructions from the first core and the second core.

(2) The system of (1), wherein the first core and the second core are part of a rate update engine, and wherein the rate update engine is configured to: receive, by one or both of the first and second core, a rate update engine (RUE) event; and process the RUE event to generate a RUE response, wherein the RUE response includes one or more congestion control parameter values for updating a connection associated with the RUE event.

(3) The system of (2), wherein the rate update engine is further configured to: receive a plurality of RUE events; and load balance the RUE events based on whether the plurality of RUE events are associated with the same connection.

(4) The system of either (2) or (3), wherein the rate update engine: is configured to receive, from a hardware transport layer managing a plurality of connections, the RUE event; and in processing the RUE event, the rate update engine is configured to maintain a state for a connection associated with the RUE event, that is separate from a state for the connection maintained by the hardware transport layer.

(5) The system of any one of (1) through (4), wherein instructions of the one or more first types and one or more second types include one or more of a Log 2Floor instruction, a clamp instruction, one or more instructions for a getPacketTiming function, one or more instructions for a getSmooth function, a divider instruction, or a multiplier instruction.

(6) The system of any one of (1) through (5), further including a shared instruction memory, wherein the shared instruction memory is shared by the first core and the second core.

(7) The system of (6), wherein the shared instruction memory includes a separate read port for each of the first core and the second core.

(8) The system of either (6) or (7), wherein the shared instruction memory includes a plurality of memory bank partitions.

(9) The system of (8), wherein output from the plurality of memory bank partitions is combined by an XOR operation.

(10) The system of any one of (1) through (9), further including a first data memory in communication with the first core and a second data memory in communication with the second core.

(11) The system of any one of (1) through (10), wherein the register file includes a plurality of custom state registers.

(12) Other aspects of the disclosure includes methods including instructions that when performed by a plurality of cores, causes the plurality of cores to perform operations as in any one of (1) through (11). Other aspects of the disclosure include computer-readable storage media and computer program products including instructions, that when executed, causes the plurality of cores to perform operations as in any one of (1) through (11).

(13) A method, including: receiving, at a computing device having a plurality of customized cores, an instruction for congestion control; inputting, based on a type of the instruction, the instruction to a given one of the plurality of customized cores; processing, by a first core of the plurality of customized cores, the instruction independently of processing by other cores in the plurality of customized cores; and providing, by the first core, the processed instruction to a multiported register file.

(14) The method of (13), further including accessing, by the first core, an instruction memory shared with a second core.

(15) The method of (14), wherein accessing the instruction memory includes executing a collision avoidance algorithm including: snooping read addresses from the first core and the second core; determining that the first core and the second core are reading from a same memory location for multiple cycles; and issuing a stall to one of the first core or the second core.

(16) The method of any one of (13) through (15), wherein the instruction memory includes a plurality of memory bank partitions, the method further including combining output from the plurality of memory bank partitions with an XOR operation.

(17) The method of (16), further including: receiving, by the computing device, a rate update engine (RUE) event; and processing, by the plurality of customized cores, the RUE event to generate a RUE response, wherein the RUE response includes one or more congestion control parameter values for updating a connection associated with the RUE event.

(18) The method of either (16) or (17), further including: receiving, by the computing device, a plurality of RUE events; and load balancing, by the computing device, the plurality of RUE events based on whether RUE events are associated with the same connection.

(19) The method of any one of (13) through (18), wherein receiving the plurality of RUE events includes receiving the plurality of RUE events from a hardware transport layer managing a plurality of connections.

(20) The method of (19), further including: processing the plurality of RUE events, including maintaining a state for a connection associated with a RUE event that is separate from a state for the connection maintained by the hardware transport layer.

(21) The method of (13), wherein instructions of the one or more first types and one or more second types include one or more of a Log 2Floor instruction, a clamp instruction, one or more instructions for a getPacketTiming function, one or more instructions for a getSmooth function, a divider instruction, or a multiplier instruction.

(22) A system including a plurality of customized cores configured to perform operations as in the method of any one of (1) through (21).

(23) One or more non-transitory computer-readable storage media storing instructions that when executed by a processing device including a plurality of processing cores, causes the processing device to perform operations as in any one of (1) through (21).

(24) One or more computer program products including instructions that when executed by a processing device including a plurality of processing cores, causes the processing device to perform operations as in any one of (1) through (21).

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:

a first processor core having a first computing unit dedicated to processing congestion control instructions of one or more first types;

a second processor core having a second computing unit dedicated to processing congestion control instructions of one or more second types, the first and second processor cores processing events independently of one another; and a register file in communication with each of the first processor core and the second processor core and adapted to receive processed instructions from the first processor core and the second processor core, and wherein instructions of the one or more first types and one or more second types comprise one or more of a Log 2Floor instruction, a clamp instruction, one or more instructions for a getPacketTiming function, one or more instructions for a getSmooth function, a divider instruction, or a multiplier instruction.

2. The system of claim 1, wherein the first processor core and the second processor core are part of a rate update engine, and wherein the rate update engine is configured to:

receive, by one or both of the first and second processor cores, a rate update engine (RUE) event; and process the RUE event to generate a RUE response, wherein the RUE response comprises one or more congestion control parameter values for updating a connection associated with the RUE event.

3. The system of claim 2, wherein the rate update engine is further configured to:

receive a plurality of RUE events; and load balance the RUE events based on whether the plurality of RUE events are associated with the same connection.

4. The system of claim 2, wherein the rate update engine:

is configured to receive, from a hardware transport layer managing a plurality of connections, the RUE event; and in processing the RUE event, the rate update engine is configured to maintain a state for a connection associated with the RUE event, that is separate from a state for the connection maintained by the hardware transport layer.

5. The system of claim 1, further comprising a shared instruction memory, wherein the shared instruction memory is shared by the first processor core and the second processor core.

6. The system of claim 5, wherein the shared instruction memory comprises a separate read port for each of the first processor core and the second processor core.

7. The system of claim 5, wherein the shared instruction memory comprises a plurality of memory bank partitions.

8. The system of claim 7, wherein output from the plurality of memory bank partitions is combined by an XOR operation.

9. The system of claim 1, further comprising a first data memory in communication with the first processor core and a second data memory in communication with the second processor core.

10. The system of claim 1, wherein the register file comprises a plurality of custom state registers.

11. A method, comprising:

receiving, at a computing device having a plurality of customized cores, an instruction for congestion control;

inputting, based on a type of the instruction, the instruction to a given one of the plurality of customized cores;

processing, by a first core of the plurality of customized cores, the instruction independently of processing by other cores in the plurality of customized cores; and providing, by the first core, the processed instruction to a multiported register file, and wherein accessing the instruction memory comprises executing a collision avoidance algorithm comprising snooping read addresses from the first core and the second core, determining that the first core and the second core are reading from a same memory location for multiple cycles, and issuing a stall to one of the first core or the second core.

12. The method of claim 11, further comprising accessing, by the first core, an instruction memory shared with a second core.

13. The method of claim 12, wherein the instruction memory comprises a plurality of memory bank partitions, the method further comprising combining output from the plurality of memory bank partitions with an XOR operation.

14. The method of claim 13, further comprising:

receiving, by the computing device, a rate update engine (RUE) event; and processing, by the plurality of customized cores, the RUE event to generate a RUE response, wherein the RUE response comprises one or more congestion control parameter values for updating a connection associated with the RUE event.

15. The method of claim 14, further comprising:

receiving, by the computing device, a plurality of RUE events; and load balancing, by the computing device, the plurality of RUE events based on whether RUE events are associated with the same connection.

16. The method of claim 11, wherein receiving the plurality of RUE events comprises receiving the plurality of RUE events from a hardware transport layer managing a plurality of connections.

17. The method of claim 16, further comprising:

processing the plurality of RUE events, comprising maintaining a state for a connection associated with a RUE event that is separate from a state for the connection maintained by the hardware transport layer.

18. The method of claim 11, wherein instructions of the one or more first types and one or more second types comprise one or more of a Log 2Floor instruction, a clamp instruction, one or more instructions for a getPacketTiming function, one or more instructions for a getSmooth function, a divider instruction, or a multiplier instruction.

* * * * *